3,151,016
METHOD OF MAKING PRESSED FIBER BOARD
Leon Kutik, Bronx, N.Y., and Karl H. Schmidt, Cincinnati, Ohio, assignors to Interchemical Corporation, New York, N.Y., a corporation of Ohio
No Drawing. Filed July 13, 1962, Ser. No. 209,775
2 Claims. (Cl. 162—136)

This invention relates to a method of improving the surface properties of pressed fiber boards by applying resinous compositions to a squeezed wet mat of fibrous material before treatment with elevated pressure and elevated temperature.

Pressed boards are made, for example, by exploding clear yellow pine wood chips under high steam pressures. The resulting fibers are then felted on a Fourdrinier machine and compressed in steam-heated, flat-bed hydraulic presses. The product is highly resistant to moisture and is much more dense than wood, the specific gravity being about 1.02. The tensile strength is of the order of 3000 p.s.i. These boards find extensive use as wall board, interior finishes, and similar building material. A modification having better lasting quality is "tempered" pressed board. This is made by a special process comprising impregnation with polymerizable compositions and curing by baking. Besides reducing the moisture absorption, this process increases the tensile strength of the board and heightens its resistance to abrasion. Its specific gravity is 1.08 and its tensile strength is 5000 p.s.i. The "tempered" product can be used for building material. Although pressed wood is a satisfactory product in many ways, considerable improvement in the surface properties is desirable.

The objects of this invention are the improvement of resistance to scratching, staining, and abrasion and the imparting of better painting qualities and weatherability. These objects are successfully realized by the application of suitable resinous compositions onto the surface of the wet mat of fibers before the hot pressing states. This is superior to the usual surface treatments, not only because of its simplicity and economy, but also because the products so made have some superior qualities of their own. The prior art presses fiber into boards before the addition of surface-treating compositions. In this invention the resinous composition applied to the wet fibrous mat is preferably added to the extent of 1% based on the weight of dry fiber. At the state when the material is applied the surplus water has been pressed from the web and the wet mat contains about 40–60% of water. Although 1% of impregnating composition is preferred, the range of 0.5% to 10% is of interest. Pigments may be present in the compositions. When the coated wet fibrous mat is subjected to elevated temperature and pressure, the resulting impregnated boards have greatly improved surface properties over pressed board and are superior in some respects to good "tempered" pressed board.

The compositions may be applied by spraying or other appropriate methods. Evenness of application is very desirable.

POLYVINYL ACETATE EMULSION

A solution in 44.0 g. of water of 1.29 g. "Elvanol 51–05," 0.322 "Elvanol 50–42," 0.268 g. "Aerosol OT," 0.107 g. sodium bicarbonate, 0.107 g. ammonium persulfate, 0.054 g. benzoyl peroxide, and 5.38 g. vinyl acetate monomer was heated to reflux temperature (64–66° C.) and allowed to "exotherm." When the temperature reached 75° C., 48.42 g. of vinyl acetate monomer were added dropwise over a 2-hour period, the temperature remaining at 75 to 80° C. Then 0.054 g. of ammonium persulfate were added and the temperature was raised to 90° C. and maintained there for 30 minutes. The batch was then cooled and filtered through a single layer of cheese-cloth. The solids content was 56.7%.

"Elvanol 51–05" is a low viscosity polyvinyl alcohol, 88% hydrolyzed.

"Elvanol 50–42" is a high viscosity polyvinyl alcohol, 88% hydrolyzed.

Example 1

54.5 g. of the above polyvinyl acetate emulsion, 30.9 g. of water, and 0.6 g. of mono-octyl acid phosphate were mixed together in the order listed. The wet mat of fibers containing 40–60% of water was sprayed with the mixture to a resin solids uptake of 1.0% based on dry fiber weight. The mat was then pressed against a satin-finish chromium-plated steel plate and heated 30 seconds at 425° F. at about 400 pounds per square inch and then 6½ minutes at about 35 p.s.i. Perfect release was obtained and the board so produced had better surface properties than either pressed board without impregnation or board commercially tempered by prior art methods and materials. Abrasion resistance and paint hold-out were superior to those of commercially tempered hard board and impregnated pressed board. Weatherability was good but not as good as in Example 2.

Example 2

A. There were mixed together 840 g. styrene, 300 g. acrylonitrile, 60 g. methacrylic acid, 24 g. "Duponol C," 0.72 g. ammonium persulfate, and 1800 g. water. One quarter of the mixture was heated to reflux in a flask. The remainder was added dropwise over a period of 1½ to 2 hours, the temperature being maintained at the reflux point. The mixture was then heated to 97° C., cooled, and filtered. The solids content was 38.1.

B. 75.2 parts of A were slowly mixed, in order, with 18.8 parts water, 4.6 parts morpholine, 1.1 parts of isoamyl isooctyl acid phosphate, and 0.3 parts of ammonium sulfate. Solids content was 30.1%.

C. 30.0 parts of the hexamethyl ether of hexamethylol melamine were mixed with 70 parts water.

B and C were mixed in a 1:1 proportion by weight to form the impregnating composition.

Board coated with this composition as in Example 1 had exceptional weather resistance (did not fail when exposed 1000 hours in the weatherometer).

Example 3

A. 2.0 parts of methyl cellulose having a viscosity of 15,000 cps. and 1.5 parts of octyl decyl acid phosphate were emulsified in 36.7 parts of water. 32.9 parts rutile titanium dioxide pigment, 2.1 parts finely divided mica, and 1.8 parts "Santocel C" (a light-weight porous silica aerogel from which the water has been removed) were stirred in until the consistency was smooth. The mixture was loosely ground in a 3-roll mill in one pass. 23 parts of the above described polyvinyl acetate emulsion were then stirred in.

B. 12.6 parts of the hexamethyl ether of hexamethylol melamine were stirred in 87.4 parts of water.

To make the impregnating composition, 2 parts of A were added to 1 part of B. The solids content (38.8%) was then reduced to 20% with water.

Boards made from this composition by the method of Example 1 had excellent release. The color was an off white.

"Aerosol OT" is dioctyl sodium sulfoscuccinate.

"Duponol C" is sodium lauryl sulfate.

The phosphates used in Examples 1 and 3 were commercially available release agents rather than pure chemical compounds.

What is claimed is:

1. In the manufacture of pressed wood, the step consisting essentially of applying a resinous impregnating composition selected from the group consisting of (a) an emulsion of polyvinyl acetate containing a release agent, (b) an emulsion of a copolymer of 70 parts by weight of styrene, 25 parts by weight of acrylonitrile, and 5 parts by weight of methacrylic acid in admixture with the hexamethyl ether of hexamethylol melamine in the approximate ratio of 4 parts by weight of said copolymer to 3 parts by weight of said melamine compound and containing a release agent, (c) a mixture of approximately 2 parts by weight of polyvinyl acetate in emulsion form 1 part by weight of the hexamethyl ether of hexamethylol melamine, 3 parts by weight of pigment, and a release agent; the release agent in (a), (b), and (c) being selected from the group consisting of monooctyl acid phosphate, isoamyl isooctyl acid phosphate, and octyl decyl acid phosphate, and being present in the amount of about 0.5 to 3 percent by weight based on the weight of solids to the surface of a web of wet wood fibers, the application being made after the surplus water has been squeezed from the web and before the web has been subjected to pressure at elevated temperatures.

2. In the manufacture of pressed wood, the step consisting essentially of applying 0.5 to 10 percent by weight, based on the dry weight of the fibers, of the resinous impregnating composition defined in claim 1 to the surface of a web of wet wood fibers, the web containing about 40–60 percent by weight of water, the application being made before the web has been subjected to pressure at elevated temperatures.

References Cited in the file of this patent

UNITED STATES PATENTS

| | | |
|---|---|---|
| 2,375,450 | Walter | May 8, 1945 |
| 2,678,588 | Wait | May 18, 1954 |
| 2,863,364 | Rosenquist | Dec. 9, 1958 |
| 3,039,913 | Merrill | June 19, 1962 |
| 3,054,717 | Turner | Sept. 18, 1962 |
| 3,056,718 | Grissom | Oct. 2, 1962 |